(12) United States Patent
Savoj et al.

(10) Patent No.: US 7,710,156 B1
(45) Date of Patent: May 4, 2010

(54) CLOCK GATING BY USAGE OF IMPLIED CONSTANTS

(75) Inventors: Hamid Savoj, Los Altos Hills, CA (US); David Berthelot, Santa Clara, CA (US)

(73) Assignee: Envis Corporation, Santa Clara, CA (US)

( * ) Notice: Subject to any disclaimer, the term of this patent is extended or adjusted under 35 U.S.C. 154(b) by 0 days.

(21) Appl. No.: 12/343,249

(22) Filed: Dec. 23, 2008

(51) Int. Cl.
*H03K 19/00* (2006.01)

(52) U.S. Cl. .......................... 326/93; 326/31
(58) Field of Classification Search .................. 326/93, 326/95, 21, 31
See application file for complete search history.

(56) References Cited

U.S. PATENT DOCUMENTS

| | | | |
|---|---|---|---|
| 5,025,387 A | | 6/1991 | Frane |
| 6,822,478 B2 * | | 11/2004 | Elappuparackal ............ 326/46 |
| 7,080,334 B2 * | | 7/2006 | Fan et al. ....................... 716/6 |
| 7,095,251 B2 | | 8/2006 | Wilcox et al. |

OTHER PUBLICATIONS

Hurst. "Automatic synthesis of clock gating logic with controlled netlist perturbation." Proceedings of DAC, Jun. 8-13, 2008, Anaheim, CA, pp. 654-657.

* cited by examiner

*Primary Examiner*—James Cho
(74) *Attorney, Agent, or Firm*—Swernofsky Law Group PC

(57) ABSTRACT

A circuit $\Theta$ is coupled to an individual node $N_{in}$, in a circuit for which repeated logical values of that individual node can be identified as having a set of flip-flops $F_j$ dependent thereon, with the effect that if the individual node $N_{in}$ remains unchanged for one or more clock cycles, the set of dependent flip-flops $F_j$ can be disabled for the second and succeeding clock cycles. The circuit $\Theta$ conditionally generates a clock-enabling signal $N_{out}$ in response thereto. One such circuit $\Theta$ conditionally includes a logical controller, whose output is coupled using a fan-out node to both an input to a state machine and a fan-in logic circuit (such as an AND gate). The flip-flop is clocked normally; its output is coupled to that same fan-in logic circuit, whose output $N_{out}$ is coupled to the set of dependent flip-flops $F_j$.

8 Claims, 2 Drawing Sheets

CLOCK GATING BY USAGE OF IMPLIED CONSTANTS

BACKGROUND

Figure 1:
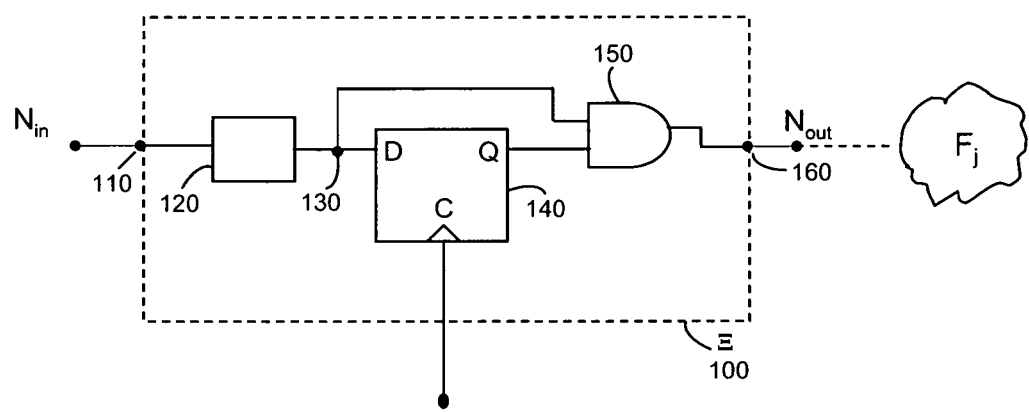

In integrated circuits there are often a substantial number of flip-flops, and related types of circuits, such as buffers and registers. Generally, each flip-flop has a clock input C, a data input D, and a data output Q. The flip-flop is disposed so that when the clock input C is changed, the data input D is stored in the flip-flop, with the effect that the value of data output Q will be set, on the next cycle of the clock input C, to the value of data input D. Due to the design of these circuits and the nature of the transistors used in that design, each flip-flop consumes dynamic power when used, even if the new value $D_{t+1}$ stored in the flip-flop does not change from its old value $D_t$.

Known systems include those which disable entire sub-units of a chip when not in use, e.g., a processor might disable clocking of its floating point sub-processor when that unit is not needed. One such system is taught in U.S. Pat. No. 5,025,387 (Frane), in which an MPU generates a HALT signal, which is used to "disable" its own clock. In Frane, to "disable" the clock signal means that the clock signal is still generated and used, but at a lower frequency that the rest of the circuit. Lowering the frequency of the clock signal reduces the number of times each flip-flop in the MPU must actually change state (and thus consume power).

U.S. Pat. No. 7,095,251 B2 (Wilcox et al.) states that disabling entire registers of flip-flops is known, including detecting those entire registers whose value does not change, and inserting circuit elements to disable those registers in response to those circumstances, at least in those cases where the register is large enough to justify the additional circuit elements. Wilcox shows a system which mixes full-cycle gating and half-cycle gating, which might allow for finer control of area and power consumption.

Wilcox mentions the possibility of comparing a flip-flop's output with its input using an XOR gate, or other logically equivalent circuits, but states that such an approach suffers from too many drawbacks to be practical.

SUMMARY OF THE DESCRIPTION

The description includes a circuit which performs "sequential clock gating", i.e., those flip-flops whose data input D does not change for at least one clock cycle are detected and have their clock inputs disabled for that at least one clock cycle. For each individual node (sometimes referred to herein as "net") $N_i$ in the circuit, there are identified a set of (some number of) flip-flops $F_j$ dependent thereon. When that node $N_i$ takes on a particular value $v_i$, the data input D of $F_j$ is forced to a particular value $v_j$. If the individual node $N_i$ takes on that particular value $v_i$ and remains unchanged for k clock cycles, the set of dependent flip-flops $F_j$ each maintains its data input D as a value $v_j$ for those k clock cycles, and can be disabled for the second and succeeding ones of those clock cycles, i.e., k−1 clock cycles. In this context, to "disable" the clock signal means to hold the clock signal at a constant voltage, with the effect that neither rising clock edges nor falling clock edges are generated.

In one embodiment, an individual node $N_{in}$ in the circuit is coupled to a circuit Θ which in response thereto, only conditionally generates a clock-enabling signal $N_{out}$. The circuit Θ conditionally includes an logical controller (such as, e.g., an inverter), depending on whether the dependent flip flops $F_j$ should remain unchanged in response to a repeated logical value $v_i = 0$ or a repeated logical value $v_i = 1$,. An output of the logical controller is coupled using a fan-out node to both an input to a state machine (such as, e.g., a flip-flop) and a fan-in logic circuit (such as, e.g., an AND gate). The state machine is clocked normally; its output is coupled to that same fan-in logic circuit. An output of the fan-in logic circuit $N_{out}$ is coupled to the set of dependent flip-flops $F_j$, with the effect that if the individual node $N_{in}$ in the circuit remains unchanged (at a selected logical value 0 or logical value 1 ), the circuit Θ disables the set of dependent flip-flops $F_j$.

In one embodiment, for each individual node $N_i$ in the circuit, a method determines which, if any, flip-flops $F_j$ are dependent on that node $N_i$ taking on and maintaining a particular value v. This is equivalent to the data input D of each such flip-flop $F_j$ taking on a repeated logical value from one clock cycle t to the next clock cycle t+1, in a superset of those cases in which node $N_i$ takes on and maintains that particular value v. Any one of several techniques can be used to detect this dependency, e.g., a BDD (binary decision diagram), an SAT (satisfiability prover), and the like.

In one embodiment, each such individual node $N_i$ in the circuit, having at least one such flip-flop $F_j$ dependent on that node $N_i$ taking on and maintaining a particular value v, has associated with it a gain parameter $G_i$, indicating, e.g., a value to be gained from disabling clock signals for those flip-flops $F_j$ dependent on that node $N_i$. In one embodiment, the gain parameter $G_i$ might be responsive to a probability, or a proxy for probability, of disabling those clock signals for those flip-flops $F_j$. For example, that probability, or proxy for probability, might be determined in response to a set of simulation vectors used as possible inputs for that circuit. Preferably, nodes $N_i$ having best gain parameter $G_i$ (e.g., highest value thereof) have the circuit Θ inserted to perform sequential clock gating of their dependent flip-flops $F_j$, and further such nodes $N_i$ have the circuit Θ inserted so long as their gain parameter $G_i$ meets or exceeds some selected threshold.

DETAILED DESCRIPTION

Figures and Text

FIG. 1

FIG. 1 shows a block diagram of a circuit.

A circuit 100 includes elements as shown in the FIG. 1, including at least an input node 110 which might be coupled to the node $N_{in}$, (conditionally) an inverter 120, a fan-out node 130 (having a value D), a flip-flop 140 (having an output value Q), a set of combinatorial logic (e.g., an AND gate) 150, and an output node 160 which might be coupled to the node $N_{out}$.

In one embodiment, the input node 110 is coupled to the node $N_{in}$, the value of which is used to determine whether or not the dependent flip-flops $F_j$ should be disabled. In some cases, the dependent flip-flops $F_j$ should be disabled if the node $N_{in}$ has and maintains the value of logical value 0; in some cases, the dependent flip-flops $F_j$ should be disabled if the node $N_{in}$ has and maintains the value of logical value 1.

In one embodiment, the (conditional) inverter 120 inverts (or does not invert, depending on the expected value of the signal from the node $N_{in}$) the signal from the node $N_{in}$, so as to assure that the output of the inverter 120 has a logical value 1 in all cases where the dependent flip-flops $F_j$ should be disabled.

There might be a first set of dependent flip-flops $^0F_j$ which should be disabled only when the signal from the node $N_{in}$ is repeated with a logical value 0, and a second set of (possibly different, but not necessarily disjoint) dependent flip-flops $^1F_j$ which should be disabled only when the signal from the node $N_{in}$ is repeated with a logical value 1. In one embodiment, the first set $^0F_j$ and that second set $^1F_j$ are treated separately. However, in the context of the invention, there is no particular requirement that the first set $^0F_j$ and that second set $^1F_j$ are treated separately; for example, a single circuit $\Theta'$ might be inserted, where appropriate, for the intersection $\{F_j:F_j$ is in both $^0F_j$ and $^1F_j\}$, for the union $\{F_j:F_j$ is in either $^0F_j$ or $^1F_j\}$, or for other such conditions.

The fan-out node 130 (having a value D) couples its value D from an output of the (conditional) inverter 120, both to a flip-flop 140, and to set of combinatorial logic (e.g., an AND gate) 150.

The flip-flop 140 receives the input value D from the fan-out node, receives a system clock signal CK, and produces an output value Q. The flip-flop 140 couples its output Q to the combinatorial logic 150.

The combinatorial logic 150 operates on its inputs (in one embodiment, on two inputs D and Q), with the effect of producing an output signal f(D, Q) (in one embodiment, D·Q). This has the effect that a value of N from an earlier time (Q) can be compared with a value of N at this time (D), with the effect that combinatorial logic 150 announces, using its output signal f(D, Q), whether the value of N from an earlier time has been repeated with the value of N at this time.

Although this embodiment shows the combinatorial logic 150 as implemented using an AND gate, in the context of the invention, there is no particular requirement that the combinatorial logic 150 is so restricted. For example, the combinatorial logic 150 might be implemented using an OR gate, or other circuitry, not necessarily digital in nature.

The output node 160 couples the output of the combinatorial logic 150 f(D, Q) (preferably D·Q) to the output node $N_{out}$. This has the effect that the circuit $\Theta$ disables the dependent flip-flops $F_j$ when the signal from the node $N_{in}$ is repeated and has the earlier selected logical value 0 (or logical value 1).

Maximal Gain Partitioning

In one embodiment, each such individual node $N_i$ in the circuit, having at least one such flip-flop $F_j$ dependent on that node $N_i$ taking on and maintaining a particular value v, has associated with it a gain parameter $G_i$, indicating, e.g., a value to be gained from disabling clock signals for this flip-flops $F_j$ dependent on that node $N_i$. In one embodiment, the gain parameter $G_i$ might be responsive to a probability, or a proxy for probability, of disabling those clock signals for those flip-flops $F_j$. For example, that probability, or proxy for probability, might be determined in response to a set of simulation vectors used as possible inputs for that circuit. Preferably, nodes $N_i$ having best gain parameter $G_i$ (e.g., highest value thereof) have the circuit $\Theta$ inserted to perform sequential clock gating of their dependent flip-flops $F_j$, and further such nodes $N_i$ have the circuit $\Theta$ inserted so long as their gain parameter $G_i$ meets or exceeds some selected threshold.

A preferred method may assign, to each such node $N_i$ and value v, a tuple of values $$<<N_i, v, Pr(N_i), Pr(\Delta N_i)>>$$

where $N_i$=an identifier for the node $N_i$;
v=the logical value for the node $N_i$ to take on and maintain;
$Pr(N_i)$=a probability, or a proxy for probability, that the node $N_i$ will have a logical value 1; and
$Pr(\Delta N_i)$=a probability, or a proxy for probability, that the node $N_i$ will change value during any given clock cycle.

In such embodiments, the preferred method may select a constrained maximal covering of the dependent flip-flops $F_j$ which maximizes $$G = [v \cdot Pr(N_i) + \sim v \cdot Pr(\sim N_i)] \cdot Pr(\sim \Delta N_i)$$

where $Pr(\sim X) = 1 - Pr(X)$, i.e., $Pr(\sim X)$ is a probability, or a proxy for probability, of event X not happening.

Maximizing G has the effect of selecting those nodes $N_{in}$ that switch the least and have the best likelihood of having the selected logical value v.

Pipeline Treatment

FIG. 2

Figure 2:
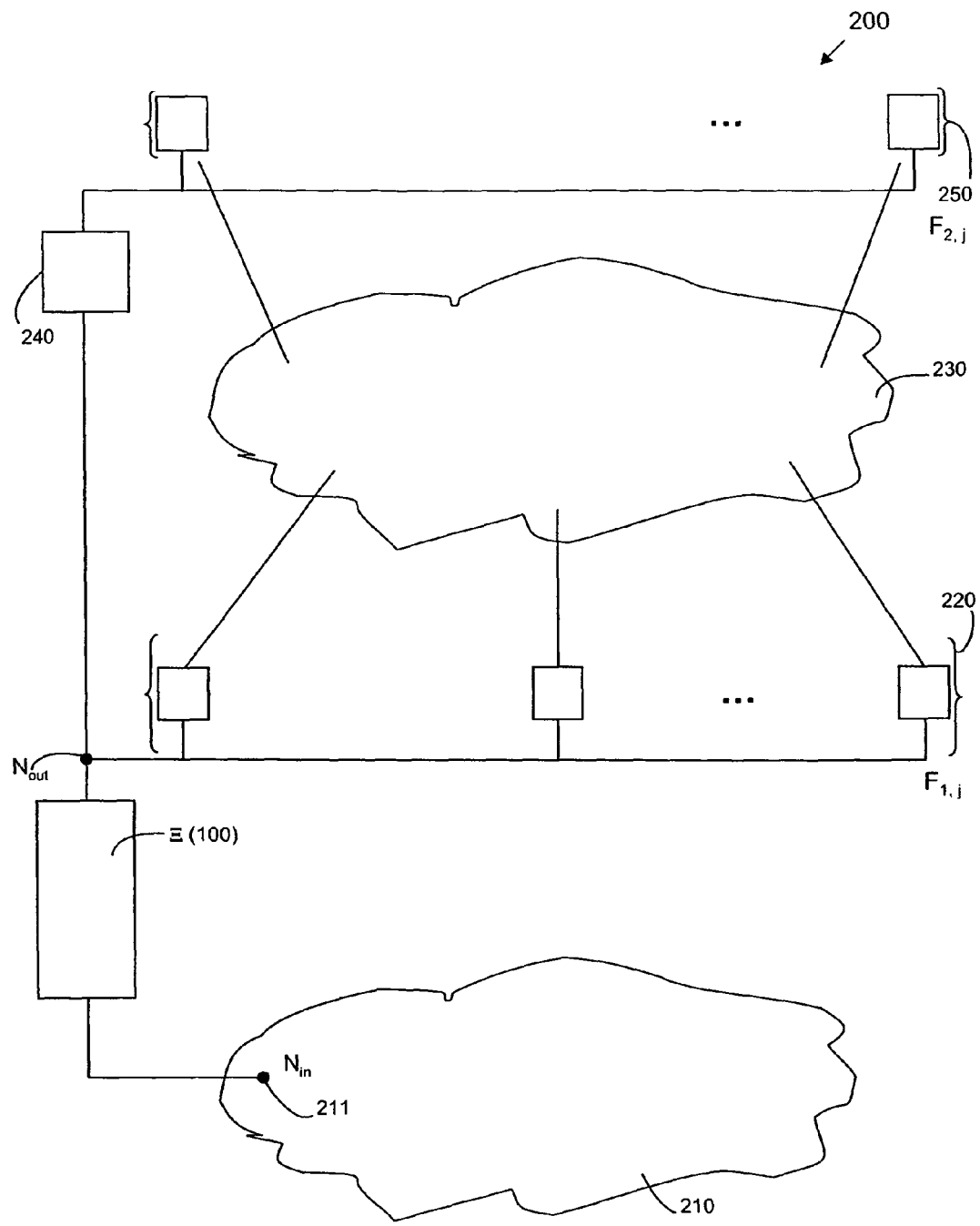

FIG. 2 shows a block diagram of a circuit.

A circuit 200 includes elements as shown in the FIG. 2, including at least a circuit 210 including at least an input node 211 $N_{in}$, coupled to a circuit $\Theta$ 100 (similar to the circuit $\Theta$ 100 in the FIG. 1), coupled to a node $N_{out}$, which is coupled to the clock inputs of a set of primary dependent flip-flops 220 $F_{1,j}$.

The set of primary dependent flip-flops 220 $F_{1,j}$ are coupled to a set of combinatorial logic 230. The node $N_{out}$ is coupled to a one clock-cycle delay flip-flop 240. The combinatorial logic 230 and the one clock-cycle delay flip-flop 240 are coupled to a set of secondary dependent flip-flops 250 $F_{2,j}$. This has the effect that if the primary dependent flip-flops 220 $F_{1,j}$ are disabled, the secondary dependent flip-flops 250 $F_{2,j}$ should also be disabled.

This has the effect that when the node $N_{out}$ is set to disable the primary dependent flip-flops 220 $F_{1,j}$, the combinatorial logic 230 should not make the changes it would otherwise make to the secondary dependent flip-flops 250 $F_{2,j}$. Similarly, this should also have the effect that the one clock-cycle delay flip-flop 240 is set to disable the secondary dependent flip-flops 250 $F_{2,j}$. Accordingly, when the primary dependent flip-flops 220 $F_{1,j}$ are disabled, the secondary dependent flip-flops 250 $F_{2,j}$ will also be disabled.

Alternative Embodiments

After reading this application, those skilled in the art would recognize that the scope and spirit of the invention includes other and further embodiments beyond the specifics of those disclosed herein, and that such other and further embodiments would not require new invention or undue experimentation.

The invention claimed is:

1. Apparatus including
   at least one node, in a circuit for which repeated logical values of that node can be identified as having a set of flip-flops dependent thereon, with the effect that if that node remains unchanged for one or more clock cycles, at least a portion of that set of dependent flip-flops can be disabled for at least the second of those clock cycles;
   a circuit coupled to that node and to that set of flip-flops, that circuit conditionally generating, in response to that node, a signal in response to which at least that portion of that set of flip-flops can be conditionally enabled.

2. Apparatus as in claim 1,
   wherein that circuit includes
   a fan-out node;
   a device maintaining state for at least one clock cycle; and
   a logic circuit coupled to that fan-out node and to an output of that device.

3. Apparatus as in claim 2,
   wherein that circuit includes
   a logical controller, responsive to whether that node should remain unchanged in response to a selected set of logical values, an output of that logical controller being coupled to that fan-out node.

4. Apparatus as in claim 1, including a delay element coupled to an output of that circuit, and to a second set of flip-flops, that delay element generating, in response to that circuit, a signal in response to which at least a portion of that second set of flip-flops can be conditionally enabled.

5. A method, including steps of detecting at a node, repeated logical values of that node, for which a set of flip-flops are dependent thereon, such that if that node remains unchanged for one or more clock cycles, at least a portion of that set of dependent flip-flops can be disabled for at least the second of those clock cycles; and generating, in response to that node, a signal in response to which at least that portion of that set of flip-flops can be conditionally enabled.

6. A method as in claim 5, wherein those steps of detecting include steps of maintaining state for at least one clock cycle.

7. A method as in claim 6, wherein those steps of detecting include steps of operating a logic circuit, an output of that logic circuit being responsive to whether that node remains unchanged in response to a selected set of logical values.

8. A method as in claim 5, including steps of, in response to those steps of generating a signal, delaying that signal, wherein those steps of delaying include steps of generating a signal in response to which a second set of flip-flops can be conditionally enabled.

\* \* \* \* \*